(12) United States Patent
Franzoi et al.

(10) Patent No.: US 9,486,975 B2
(45) Date of Patent: Nov. 8, 2016

(54) ACOUSTIC CORE

(75) Inventors: Eric Franzoi, Pasadena, MD (US); Jason Walker, Lenox, MI (US); David Kosal, Columbus, MI (US)

(73) Assignee: ZEPHYROS, INC., Romeo, MI (US)

( * ) Notice: Subject to any disclaimer, the term of this patent is extended or adjusted under 35 U.S.C. 154(b) by 580 days.

(21) Appl. No.: 13/534,340

(22) Filed: Jun. 27, 2012

(65) Prior Publication Data

US 2013/0171407 A1    Jul. 4, 2013

Related U.S. Application Data

(60) Provisional application No. 61/502,527, filed on Jun. 29, 2011.

(51) Int. Cl.
*B29C 65/00* (2006.01)
*B32B 37/00* (2006.01)
*C09J 5/10* (2006.01)
(Continued)

(52) U.S. Cl.
CPC ............... *B32B 3/12* (2013.01); *F02C 7/045* (2013.01); *G10K 11/172* (2013.01); *B29C 65/483* (2013.01); *B29C 65/526* (2013.01); *B32B 37/146* (2013.01); *F05D 2250/283* (2013.01); *F05D 2260/96* (2013.01); *Y02T 50/672* (2013.01); *Y10T 428/24149* (2015.01)

(58) Field of Classification Search
CPC ......... B32B 3/12; B32B 15/08; B32B 15/14; C09J 163/00; C09J 5/00; C08L 63/00; B29C 65/00; B29C 65/48; B29C 65/4805; B29C 65/4835; B29C 65/52; B29C 65/526; B29C 44/186; E04C 2/365; B29D 99/0089; E04B 1/82; E04B 1/84; E04B 1/86; E04B 2001/747; E04B 2001/748; E04B 2001/8461; E04B 2001/8476; E04B 2001/848; E04B 2001/8485

USPC ......... 156/60, 71, 77, 78, 79, 292, 293, 294, 156/306.6, 306.9, 325, 326, 327, 330; 428/98, 116, 117, 118; 181/284, 286, 181/288, 290, 291, 292, 293, 294; 415/119

See application file for complete search history.

(56) References Cited

U.S. PATENT DOCUMENTS 3,905,443 A * 9/1975 Sieuzac .................. 181/291
4,235,303 A * 11/1980 Dhoore .................. B64D 33/02
181/214

(Continued)

FOREIGN PATENT DOCUMENTS

CN    101463239 A    6/2009
GB    2059341    4/1981

OTHER PUBLICATIONS

ASTM C297/C297M—04: Standard Test Method for Flatwise Tensile Strength of Sandwich Constructions.*
(Continued)

*Primary Examiner* — Philip Tucker
*Assistant Examiner* — Brian R Slawski
(74) *Attorney, Agent, or Firm* — The Dobrusin Law Firm, P.C.

(57) ABSTRACT

A panel assembly and method of making the same, whereby the panel assembly includes an adhesive located onto one or more edges of a layered honeycomb structure and a mesh material adhered in between the layered honeycomb structure by the adhesive.

20 Claims, 1 Drawing Sheet

(51) Int. Cl.
    *C09J 163/00*     (2006.01)
    *B32B 3/12*     (2006.01)
    *E04B 1/82*     (2006.01)
    *F02C 7/045*     (2006.01)
    *G10K 11/172*     (2006.01)
    *B32B 37/14*     (2006.01)
    *B29C 65/48*     (2006.01)
    *B29C 65/52*     (2006.01)

(56) References Cited

U.S. PATENT DOCUMENTS

| | | | |
|---|---|---|---|
| 4,541,879 A * | 9/1985 | Riel | 156/64 |
| 5,041,323 A | 8/1991 | Rose et al. | |
| 5,160,248 A | 11/1992 | Clarke | |
| 6,736,181 B2 | 5/2004 | McNeely et al. | |
| 7,180,027 B2 | 2/2007 | Hable et al. | |
| 7,434,659 B2 | 10/2008 | Ayle | |
| 7,510,052 B2 | 3/2009 | Ayle | |
| 7,528,195 B2 | 5/2009 | Ramotowski | |
| 2004/0204551 A1 * | 10/2004 | Czaplicki et al. | 525/524 |
| 2006/0219477 A1 * | 10/2006 | Ayle | 181/288 |

OTHER PUBLICATIONS

ASTM C365/C365M—05: Standard Test Method for Flatwise Compressive Properties of Sandwich Cores.*
PCT Search Report & Written Opinion for PCT/US2012/044316; Mailed on Nov. 29, 2012.
Chinese Office Action dated Aug. 3, 2015; Application No. 2012800327135.
Chinese Office Action dated May 24, 2016; Application No. 201280032713.5.

* cited by examiner

ACOUSTIC CORE

CLAIM OF PRIORITY

The present application claims the benefit of the filing date of U.S. Provisional Application Ser. No. 61/502,527 (filed Jun. 29, 2011), the entirety of the contents of this application being hereby expressly incorporated by reference.

FIELD OF THE INVENTION

The present teachings relate to honeycomb panel core materials and a method of forming and using the materials. More particularly, the present teachings relate to a panel assembly including a mesh material, an adhesive, and a honeycomb structure.

BACKGROUND OF THE INVENTION

A jet engine nacelle is the primary structure for managing noise from a variety of jet engine functions. Traditionally, "one degree of freedom" (1DoF) honeycomb structures have offered modest noise reductions. These 1DoF structures are typically honeycomb sandwich panels that include holes through the panel skin facing the engine. These holes create a single chamber in which sound reverberates and cancels, thus creating acoustic sound absorption. However, these traditional panel structures provide no improvement in sound transmission loss (STL) across the wall of the nacelle.

More recently "two degree of freedom" (2DoF) structures were developed in an effort to improve sound absorption. These 2DoF structures use a porous septum to separate two resonating honeycomb chambers. This septum is generally a woven cloth or a perforated sheet. However, when the septum is adhered to the honeycomb chambers, the bonding process may cause adhesives and adhesive films to inadvertently cover one or more honeycomb openings thereby eliminating the ability of those covered chambers to efficiently absorb sound. Specifically, U.S. Pat. No. 5,041,323 involves a perforated septum sheet bonded between two honeycomb panels. The 323 patent discloses sintering, diffusion bonding, sprayable adhesives or adhesive films, but does not disclose any means for preventing the adhesive from covering the honeycomb openings.

U.S. Pat. No. 6,736,181 discloses a panel fabrication method that utilizes a film adhesive by locating the adhesive on a panel opposing the honeycomb openings. The 181 patent requires temporary adhesion of the film to the panel without curing the adhesive prior to locating the panel into a reticulation unit.

U.S. Pat. Nos. 7,434,659; 7,510,052; and 7,528,195 disclose inserting a cloth septum into each cell of the honeycomb to create a 2-chambered 2DoF construction. The step of locating the septum into each honeycomb cell increases fabrication time and requires specialized machinery.

Accordingly, there remains a need in the art to find improved and simplified materials that increase sound transmission loss and acoustic absorption. Further, there is a need for a panel assembly that can be easily assembled with simplified machinery and does not require insertion of a septum into each honeycomb cell and does not run the risk of film or liquid adhesives that cover the honeycomb cells. There is a further need for panel construction methods that can easily and inexpensively be tuned for a specific frequency.

SUMMARY OF THE INVENTION

The present teachings meet one or more of the above needs by providing a quickly and easily assembled panel structure with not only increased acoustic absorption, but increased sound transmission loss. This material would both reduce the noise levels in the passing jet stream and reduce the noise passing through the wall of the engine nacelle. The panel assembly comprises a backing plate, a honeycomb structure formed of two or more honeycomb layers and an adhesive located along at least one edge of at least one of the honeycomb layers. The panel assembly may further include a mesh located in contact with the adhesive. The panel may include a composite skin attached to at least one honeycomb layer. The panel assembly may include a film adhesive in planar contact with the backing plate such that at least one honeycomb layer includes a first edge and a second edge so that the second edge of the honeycomb structure contacts the film adhesive.

In another aspect, the present teachings include a method for assembly of a panel structure that includes roll coating a latent cure adhesive onto a first edge of a first honeycomb layer, the first honeycomb layer including the first edge (e.g., a top edge) and an opposing second edge (e.g., a bottom edge), and optionally roll coating the latent cure adhesive onto the second edge (e.g., bottom edge) of a second honeycomb layer, the second honeycomb layer including a top edge (e.g., first edge) and the bottom edge (e.g., second edge). The method may further include tacking a mesh onto the first edge of the first honeycomb layer and placing the second honeycomb layer onto the mesh so that the latent cure adhesive located upon each of the first and second honeycomb layers cures to create a structural bond between the first and second honeycomb layers and the mesh. To improve sound absorption, a foam material may also be located within one or more honeycomb cells.

The panel disclosed herein can be quickly and easily assembled by a roll coating process that locates the adhesive onto the honeycomb panel. The panel further provides for improved sound transmission loss and improved sound absorption. These improved properties are a function of the structure of the panel, the adhesive, and the methods used to assemble the panel. The methods used to assemble the panels may also increase the speed with which the panels are assembled. The panel disclosed provides the improved sound transmission loss and improved sound absorption over a wide range of frequencies.

DETAILED DESCRIPTION

Figure 1:
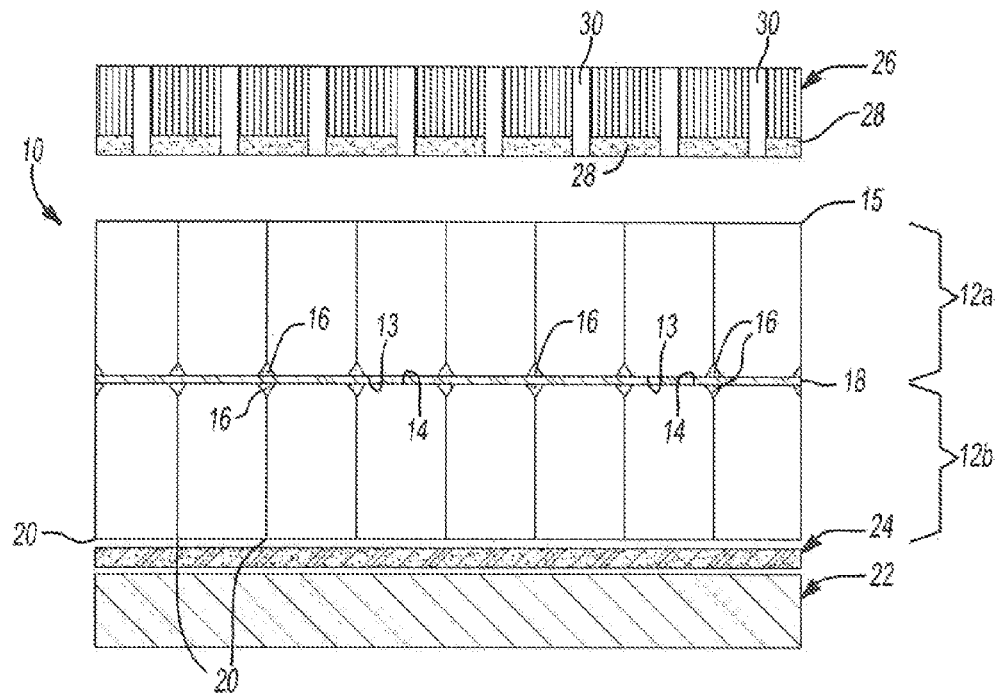
FIG. 1 is a cross-sectional view of an illustrative panel in accordance with the present teachings.

In general, the teachings herein provide for a structure that includes a honeycomb panel including one or more honeycomb layers, an adhesive (e.g., a thermosetting hot-melt adhesive) located along at least one edge of the one or more honeycomb layers, and a mesh located in contact with the adhesive. The panel structure may utilize a heat activated adhesive to structurally bond a septum mesh to at least one edge of the one or more honeycomb layers. The honeycomb structure may include two honeycomb layers and the adhesive and mesh may be located in between the two honeycomb layers. The adhesive is preferably located along the first edge of a first honeycomb layer and the second edge of a second honeycomb layer to form a structural adhesive bond within nacelle engine structures. The use of the adhesive enables one to locate the septum mesh in between the honeycomb layers and then cure the adhesive when the panel is formed, thereby creating the structural bond. The panel may also include a backing plate and a composite skin and an adhesive or other fastening mechanism for attaching the backing plate and composite skin to one or more of the honeycomb layers.

The arrangement of the panel and the nature of the adhesive provide for an improved assembly process that avoids unintended covering of the honeycomb openings wherein the adhesive is roll coated onto an edge of one or more honeycomb panels and a mesh is located in between at least two honeycomb layers. The adhesive may cure upon exposure to heat, UV light, moisture or other stimuli. The adhesive may cure vvithout exposure to any stimuli. One or more backing plates and/or composite skins may then be attached to the honeycomb layers to complete formation of the panels. The panel structures are preferably free of any adhesive film material located in between the honeycomb layers so that the honeycomb openings are not covered by any adhesive film. By covering one or more honeycomb openings, sound is prevented from moving through the honeycomb layers and may prevent the panel from functioning as intended. The use of an adhesive as described herein provides the requisite structural bond between the honeycomb structure and the mesh without covering the cells of the honeycomb structure. The adhesive further provides improved function over standard liquid adhesives, which may wet through the mesh or drip, also preventing the panel from absorbing sound.

As discussed herein, the adhesive is preferably formulated to have a viscosity, pot life, and glass transition temperature so that the panels described herein can be formed by a roll-coating process whereby the adhesive does not drip or prematurely cure. The adhesive may be a latent cure adhesive. The adhesive may cure only upon application of heat. The adhesive may comprise an epoxy resin. Epoxy resin is used herein to mean any of the conventional dimeric, oligormeric or polymeric epoxy materials containing at least one epoxy functional group. The epoxy resin may be a bisphenol-A epoxy resin. The epoxy resin may comprise from about 2% to about 80% by weight of the adhesive. The epoxy resin may comprise from about 15% to about 50% by weight of the adhesive. The epoxy resin may comprise at least about 15% by weight of the adhesive. The epoxy resin may comprise less than about 60% by weight of the adhesive. The epoxy resin may be a liquid or a solid epoxy resin or may be a combination of liquid and solid epoxy resins.

The adhesive may also include an epoxy/elastomer adduct. More specifically, the adduct may be composed substantially entirely (i.e., at least 70%, 80%, 90% or more) of one or more adducts that are solid at a temperature of 23° C. The adduct may comprise from about 5% to about 80% by weight of the adhesive. The adduct may comprise at least about 10% by weight of the adhesive. The adduct may comprise at least about 20% by weight of the adhesive. The adduct may comprise less than about 70% by weight of the adhesive. The adduct may comprise less than about 40% by weight of the adhesive. The adduct itself generally includes about 1:5 to 5:1 parts of epoxy to elastomer, and more preferably about 1:3 to 3:1 parts of epoxy to elastomer. Examples of suitable adducts include solid and liquid carboxyl-terminated nitrile rubber, liquid nitrile rubbers that have amine functionality and any elastomer, polysiloxane, epoxidized polysulfide, diisocyanate and any elastomer, plastomer or thermoplastic that can react with epoxy. Functionalities that are particularly useful include, carboxyl, amine, isocyanate and maleic anhydride.

Examples of additional or alternative epoxy/elastomer or other adducts suitable for use with the present teachings are disclosed in U.S. Patent Publication 2004/0204551, which is incorporated herein by reference for all purposes. As a specific example, the epoxy resin may include from about 20% to about 40% by weight CTBN/epoxy adduct.

The adhesive may include an elastomer. Exemplary elastomers include, without limitation, natural rubber, styrene-butadiene rubber, polyisoprene, polyisobutylene, polyvinyl, polybutadiene, isoprene-butadiene copolymer, neoprene, nitrile rubber (e.g., a butyl nitrile, such as carboxy-terminated butyl nitrile (CTBN)), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like.

The adhesive may also include one or more additional polymer and/or copolymer materials, such as thermoplastics, elastomers, elastomers, combinations thereof or the like. Polymers that might be appropriately incorporated into the adhesive include halogenated polymers, core/shell polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

The adhesive may also include a variety of curing agents and fillers. Examples of suitable curing agents include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bis-hydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the adhesive. Another preferred curing agent is dihydrazides, particularly isophthalic dihydrazide.

Examples of suitable fillers include silica, MIOX, fumed silica, wollastonite, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the adhesive material in leveling itself during flow of the material. The clays that may be used as fillers may include clays from the kaolinite, illite, chloritem, smecitite or sepiolite groups, which may be calcined. One such filler may include a Garamite® product, available from Southern Clay Products, Inc. of Gonzales, Tex. One or more mineral or stone type fillers such as calcium carbonate, sodium carbonate or the like may be used as fillers. Such mineral fillers may improve the stiffness of the cured adhesive and assist in improving the viscosity of the adhesive to its desired level. Examples of additional suitable fillers include, without limitation, talc, vermiculite, pyrophyllite, sauconite, saponite, nontronite, montmorillonite or mixtures thereof. In another preferred embodiment, silicate minerals such as mica may be used as fillers. Preferably the filler includes a material that is generally non-reactive with the other components present in the activatable material. While the fillers may generally be present within the activatable material to take up space at a relatively low weight, it is contemplated that the fillers may also impart properties such as strength and impact resistance to the activatable material.

As discussed herein, the adhesive has particular benefit for use in a roll coating process. The composition of the adhesive provides for a desirable viscosity upon heating of the adhesive during the roll coating process. The rolls are thus heated to soften the adhesive and to make the adhesive more fluid-like to allow the adhesive to flow in such a way that it can effectively coat a honeycomb substrate without covering the honeycomb openings. The viscosity is thus critical to enable the proper build up of the adhesive. The processing temperature of the roll coating process can act to modify the viscosity of the material to enable coating without undesirable dripping or covering of the honeycomb cell openings. Coating temperatures that are too low, may result in poor coating due to poor wetting characteristics. Low coating temperatures can also cause the adhesive viscosity to be so high that the adhesive will not properly wet and adhere to the honeycomb. The coating temperature cannot be too high, as a crosslinking/curing reaction of the adhesive may be initiated. High coating temperatures may also cause the adhesive to have increased fluidity and thus an increased likelihood that the adhesive may cover or drip into one or more honeycomb openings during the roll-coating process.

During the roll coating process, the adhesive should have a viscosity that is not so low as to cause the adhesive to drip or present challenges to locating the adhesive onto an edge of a honeycomb structure. Further, the viscosity of the adhesive cannot be so low that the roll-coating process would cause the adhesive to cover or form a film that at least partially covers one or more honeycomb cells upon locating the adhesive onto an edge of the honeycomb structure. The viscosity cannot be so high as to prevent adhering of the adhesive to the honeycomb. Preferred viscosity of the adhesive at 8 rad/s may be at least about 500 Pa·s, or at least about 200 Pa·s at 37 rad/s. The viscosity of the adhesive at 8 rad/s may be less than about 2500 Pa·s, or less than about 1500 Pa·s at 37 rad/s. The viscosity of the adhesive at 8 rad/s may be from about 700 Pa·s to about 2000 Pa·s. The viscosity of the adhesive at 37 rad/s may be from about 500 Pa·s to about 1500 Pa·s.

The adhesive may also have a sufficient pot life to prevent premature cure of the adhesive. The minimum pot life of the adhesive may be about 45 minutes. Coating the rolls of the roll coater with the adhesive may take at least about 10 minutes to evenly spread the adhesive along each roll. Cleaning the adhesive from the machine after processing may also take at least about 10 minutes. Thus, a processing time of only about 25 minutes may remain for an adhesive having a pot life of about 45 minutes. An adhesive having a pot life of less than about 45 minutes (depending upon the temperature that the adhesive experiences) may not allow for sufficient processing time to coat a substantial number of panels. The temperature of the rolls may also affect pot life of the adhesive. Processing temperatures for the roll coating process are generally from about 200° F. to 275° F. As an example, at a coating temperature of about 275° F., the pot life of the adhesive may be about 45 minutes. However, when the temperature is reduced to about 260° F., the pot life can be significantly increased, even increased by a factor of two or even greater. However, a reduction in the roll coating temperature may also have a deleterious effect on the viscosity (e.g., by increasing the viscosity), therefore a balance exists between pot life and viscosity. The pot life of the adhesive at about 235° F. may be from about 15 minutes to about 90 minutes. The pot life of the adhesive at about 235° F. may be at least about 30 minutes. The pot life of the adhesive at about 235° F. may be less than about 70 minutes. The pot life of the adhesive at about 235° F. may be from about 40 minutes to about 60 minutes.

The panels may be exposed to temperatures in excess of 300° F. and thus the adhesive may be formulated so that it has a glass transition temperature that exceeds the high temperatures to which the adhesive will be exposed to during panel use. The glass transition temperature of the adhesive may be from about 70° C. to about 270° C. The glass transition temperature of the adhesive may be at least about 110° C. The glass transition temperature of the adhesive may be less than about 240° C. The glass transition temperature of the adhesive may be from about 115° C. to about 230° C. Certain epoxy components may assist in increasing the glass transition temperature of the adhesive. The adhesive may also be resistant to fluids common to jet engines including but not limited to fuel, hydraulic fluid and water.

During the roll coating process, the adhesive is located onto a honeycomb structure. The honeycomb structure may define a plurality of openings into which additional panel components may be located. The honeycomb structure may be formed of a metal material such as aluminum. The honeycomb structure may be a thermoplastic or thermoset polymeric material, which may or may not be reinforced with minerals or fibrous materials (e.g., glass, carbon or nylon fibers). It is contemplated, however, that the honeycomb layers may be formed of a combination of several materials including metals, polymers, fibrous materials (e.g. cardboard, paper materials), combinations thereof or the like which may be coated or uncoated.

A mesh material may also be located onto one or more honeycomb layers. The mesh may be located in between two honeycomb layers. The use of the adhesive described herein allows for the mesh to be located in between two honeycomb layers without the deleterious effects of adhesive films or liquid adhesives that may cover the honeycomb cells, wet-through the mesh, or drip. The mesh material preferably includes a plurality of pores having a consistent size or variable size. The pores may be formed as openings having an average size of at least about 3 microns. The pores may be formed as openings having an average size of less than about 50 microns. The pores may be formed as openings having an average size of at least about 10 microns. The pores may be formed as openings having an average size of 25 microns or less. The mesh may be a twill weave or square weave mesh. The mesh may include a monofilament weave composed of polymeric materials including but not limited to polyethylene terephthalate (PET), polyetheretherketone (PEEK), polycaprolactam, polyamide 6-6, polytetrafluoroethylene, polyvinylidene chloride (PVDC), polysulfone, polyphenylene sulfide, or combinations thereof. The mesh may also be composed of glass fiber, carbon fiber or aramid fiber. In one preferred embodiment, the mesh may include a twill weave monofilament comprising polyetheretherketone and having an average pore opening size of about 10 microns to about 25 microns.

The mesh material is provided as a means for improving acoustic absorption. Thus, the mesh material preferably has a rayl value (P·s/m) of at least about 5 rayls, more preferably at least about 20 rayls, or even more preferably at least about 70 rayls. The rayl value may be less than about 150 rayls.

A foam material may also be located onto or within one or more of the honeycomb layers. In one embodiment the foam may be located in contact with the mesh layer. The foam typically provides the panel structure with improved sound transmission loss. The foam is typically selected so as to be activatable under a desired condition. Upon activation, the foam may be an open cell foam or a closed cell foam. As used herein, activatable means that the material softens (e.g, melts), cures, expands, foams or a combination thereof upon exposure to a condition such as heat or upon the combination of particular chemicals (e.g., 2-component materials). Typically, the material, upon activation, can wet, and preferably bond to adjacent surfaces.

Similar to the adhesive discussed herein, the foam material preferably has a post-cure glass transition temperature that is greater than any temperatures to which the material may be exposed while in its intended environment of use. The glass transition temperature of the foam may be from about 70° C. to about 270° C. The glass transition temperature of the foam may be at least about 110° C. The glass transition temperature of the foam may be less than about 240° C. The glass transition temperature of the foam may be from about 115° C. to about 230° C. Due to the consistently high temperatures experienced by the foam, the foam must also be stable at temperatures exceeding 300° F. for at least about 10,000 hours without deterioration.

Other desired characteristics of the foam might include good adhesion retention and degradation resistance particularly in adverse environments such as highly variable temperature environments, high dynamic activity environments, combinations thereof or the like. For particular embodiments the foam may stay in a softer or gelled state or it may become more solid upon cure.

The foam may be a polyimide foam, an epoxy foam, an acrylonitrile foam, or any combination thereof. The foam may be a thermoplastic, a thermoset or a blend thereof. According to one embodiment, the foam is as an epoxy-containing material, an ethylene-containing polymer, an acetate or acrylate containing polymer, or a mixture thereof, which when compounded with appropriate ingredients (typically a blowing agent, a curing agent, and perhaps a filler), typically expands, cures or both in a reliable and predictable manner upon the application of heat or another activation stimulus. Thus, according to one embodiment, an exemplary foam may be a heat-activated and/or epoxy-based resin having foamable characteristics. Of course, the foam may be activated by other conditions or stimuli. Generally, it is contemplated that, particularly for higher expansion materials, the activatable foam may include or be based upon an elastomer (e.g., rubber), an acetate, an acrylate or combinations thereof.

From a chemical standpoint for a thermally-activated foam, the foam is usually initially processed as a thermoplastic material before curing. After curing, the foam typically becomes a thermoset material that is fixed and incapable of any substantial flow. Examples of preferred formulations that are commercially available include those available from L&L Products, Inc. of Romeo, Mich., under the designations L-0502, L-0504, L-1066, L-2105, L-2190 L-2663, L-5204, L-5206, L-5207, L-5208, L-5214, L-5218, L-5222, L-5248, L-6000, L-7102, L-7220, L-8000, L-8100, L-8110, L-8115, L-9000 or combinations thereof. It is also contemplated that the foam may have a fiberglass or other fabric material integrated to one or more sides of the material and/or within the material.

The foam may be formed using a variety of processing techniques. Possible processing techniques for the foam include injection molding, blow molding, thermoforming, extrusion with a single or twin screw extruder or extrusion with a mini-applicator extruder, such as that disclosed in U.S. Pat. No. 7,180,027, incorporated by reference herein for all purposes. The foam may also be formed as a blown or a cast film, particularly prior to expansion. Consider adding paragraph to describe adhesive processing (twin screw extruding) as was done for foam above. Maybe discuss coating techniques used to make film adhesive.

In applications where the foam is heat activated, such as when a thermally foaming material is employed, an important consideration involved with the selection and formulation of the foam may be the temperature at which the foam activates, cures or both. It may be desirable for the foam to expand, cure, or both at higher processing temperatures. Typical activation temperature is at least about 120° F., more typically at least about 190° F., still more typically at least about 230° F. and even more typically at least about 265° F. and typically less than about 600° F. or greater, more typically less than about 450° F. and even more typically less than about 350° F. and still more typically less than about 275° F. Exposure to such temperatures typically occurs for a period of time that is at least about 10 minutes or less, more typically at least about 20 minutes and even more typically at least about 30 minutes and typically less than about 300 minutes or greater, more typically less than about 180 minutes and even more typically less than about 90 minutes. Consider adding paragraph to discuss adhesive process temperature as related to cure temperature as was done for foam above.

Although the foam may be heat activated, it may be otherwise additionally or alternatively activated by other stimuli to cure, expand, bond, combinations thereof or the like. Without limitation, the foam may be activated by alternative stimuli such as, pressure, moisture, chemicals, ultraviolet radiation, electron beam, induction, electromagnetic radiation or by other ambient conditions. The foam may be resistant to fluids common to jet engines including but not limited to fuel, hydraulic fluid and water.

The panels may include a first backing plate (which may be a composite skin). The backing plate is preferably a solid material and may be composed of metal, polymeric materials (e.g., plastics, elastomers, thermoplastics, thermosets) or combinations thereof. The backing plate may further include one or more openings therein to allow for sound to travel through the backing plate. The materials of the backing plate may also be reinforced with minerals, fibrous materials (e.g., glass, carbon or nylon fibers), combinations thereof or the like. In one embodiment, the backing plate is formed of a metal or metal alloy.

An adhesive or other fastening means may be located onto the backing plate. The adhesive may be a film adhesive that may be located in direct planar contact with the backing plate. The fastening means may include a mechanical fastener such as a pin, tack, screw, tree-fastener, or the like. The purpose of the adhesive or other fastening mechanism is to attach the backing plate to an additional component of the panel assembly. The adhesive or other fastening means may attach the backing plate to the honeycomb structure. Alternatively, an additional component may be located in between the backing plate and honeycomb structure.

The adhesive may be located onto the top edges of the first honeycomb layer. The adhesive may be located onto the honeycomb layer by a roll coating process. The mesh material may then be located onto the first edges of the first honeycomb layer so that the mesh is adhered to the first edge of the honeycomb layer by the adhesive. The mesh may be located onto the first edge of the honeycomb layer by a hot roller to create an initial bond between the adhesive and the mesh. The adhesive may then be located onto the second edge of a second honeycomb layer. The second honeycomb layer is then placed in contact with the mesh so that the adhesive of the second honeycomb layer bonds to the mesh and the mesh is located and bonded in between the first and second honeycomb layers to form a structural bond.

One of the honeycomb layers (e.g., the first honeycomb layer) may be located onto the backing plate via a film adhesive along its second and/or first edges, so that the backing plate and/or film adhesive covers each cell of the honeycomb structure along the edge of the structure attached to the backing plate. Once the honeycomb layer is located onto the backing plate via the adhesive or other fastening means, a foam material may be located within the first honeycomb layer. The foam may be located within the honeycomb layer prior to fabrication of the panel. Each cell of the honeycomb layer may contain the same amount of foam. Each cell of the honeycomb layer may include variable amounts of foam. Upon placement of the foam within the honeycomb layer, the foam may contact the adhesive film, other fastening means, and/or backing plate. Alternatively, the foam may be located within the honeycomb layer such that the foam does not contact the adhesive film, other fastening means, or backing plate. The foam may be located within the honeycomb layer after the honeycomb layer is attached to the backing plate. The foam may be located within the honeycomb layer prior to attachment of the honeycomb layer to the backing plate. A portion of the foam may be located within the honeycomb layer prior to attachment to the backing plate, while a portion of the foam is located within the honeycomb layer after attachment to the backing plate. The foam may be located within the honeycomb layer prior to any expansion and/or cure.

A composite skin (which may be a backing plate and may or may not differ from the first backing plate) may then be located onto the first or second edge of the remaining honeycomb layer (e.g., the second honeycomb layer). The composite skin may comprise metals and/or polymeric materials (e.g., plastics, elastomers, thermoplastics, thermosets, combinations thereof or the like). The composite skin may also be reinforced with minerals, fibrous materials (e.g., glass, carbon or nylon fibers), combinations thereof or the like. In one embodiment, the composite skin is formed of a fiberglass/plastic composite. The composite skin may also include one or more openings located through the composite skin. The openings may comprise equally spaced holes that are drilled into the composite skin. The openings may be drilled into the composite skin.

An adhesive layer or other means of attachment may be used to locate the composite skin onto the honeycomb layer. The adhesive layer may be in the form of an adhesive film. The adhesive may be located onto the composite skin prior to locating the composite skin onto the honeycomb layer. Upon locating the composite skin and backing panel onto the honeycomb layers, the entire panel assembly may be placed in a heat press so that any heat activated adhesives cure and form the necessary bonds to connect all components of the panel.

Figure 2:
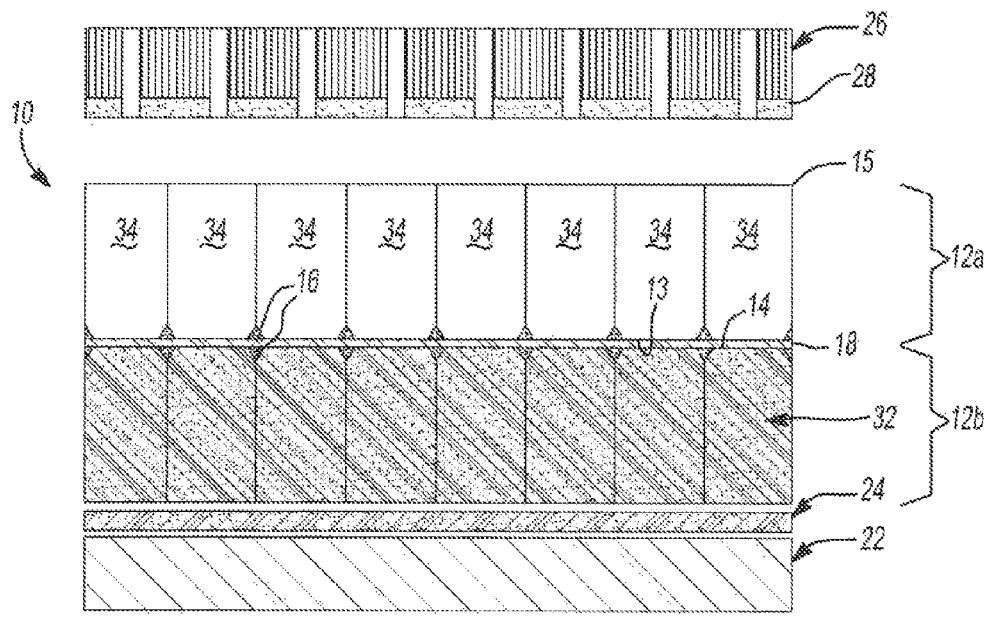
FIG. 2 is a cross-sectional view of an illustrative panel in accordance with the present teachings.

As shown for example in FIG. 1, the panel assembly 10 may include a honeycomb structure having a first honeycomb layer 12b and a second honeycomb layer 12a. The first edge 14 of the first honeycomb layer 12b may include an adhesive 16 located thereon. A mesh 18 may be located onto the adhesive 16. The second edge 13 of the second honeycomb layer 12a may also include an adhesive 16, located in contact with the mesh 18. The second edge 20 of the first honeycomb layer 12b may be located onto a backing plate 22 via an adhesive 24. A composite skin 26 may be located in direct planar contact with the first edge 15 of the second honeycomb layer 12a. The composite skin 26 may include an adhesive layer 28 for attaching to the second honeycomb layer 12a and may include one or more openings 30 located through the composite skin so that sound can travel through the composite skin and enter into the honeycomb cells. The panel assembly 10 is shown again at FIG. 2 where the honeycomb structure further includes a foam material 32 located within each honeycomb cell 34 of the first honeycomb layer 12b.

In one embodiment, the honeycomb structure is placed in a roll coating machine whereby the rolling devices contain the adhesive and the adhesive is rolled onto one or more edges of a honeycomb layer. The mesh is then attached to the first edge of the first honeycomb layer in contact with the adhesive. The adhesive may be roll coated onto the second honeycomb layer and the second honeycomb layer placed onto the mesh so that the adhesive of the second honeycomb layer. A foam may then be located within the cells one or more of the honeycomb layers. The composite skin and backing plate are then located onto opposing edges of the combined honeycomb layer/adhesive/mesh structure, whereby the resulting assembly is placed in a heated press to cure, expand, activate, or any combination thereof any adhesive or foam material located within the panel assembly.

The nature of the adhesive and mesh as attached to the honeycomb structure creates a bond having improved strength so that any attempt to separate the backing plate and the composite skin will result in a tear within the honeycomb structure as opposed to a failure along the bond between a honeycomb layer and backing plate, the honeycomb layers and mesh, or a honeycomb layer and composite skin. The test examples below demonstrate the improved bond.

Exemplary adhesive materials that are particularly suitable for use as the adhesive taught herein are described below in Table 1.

TABLE 1

|  | Example 1 | Example 2 | Example 3 | Example 4 | Example 5 |
|---|---|---|---|---|---|
| Liquid Epoxy Resin | 21.00 | 7.00 | | | |
| Epoxy Phenol Novolac Resin | | | 15.00 | 15.83 | 16.43 |
| Semi-Solid Epoxy Resin | | 24.00 | | | |
| Solid Epoxy Resin | 6.00 | 9.00 | | | |
| Novolac Epoxy Resin | 6.00 | | 41.18 | 35.68 | 26.80 |
| Epoxy Toughener | 34.00 | 27.00 | 30.00 | | 16.67 |
| Polyvinyl Resin | | | 5.00 | 18.84 | 19.86 |
| Curing Agent | 3.89 | 5.00 | 6.67 | 5.81 | 5.20 |

TABLE 1-continued

|  | Example 1 | Example 2 | Example 3 | Example 4 | Example 5 |
|---|---|---|---|---|---|
| Calcium Carbonate Filler | 27.36 | 26.25 |  | 22.60 | 14.01 |
| Clay Filler | 1.60 | 1.60 | 2.00 | 1.13 | 0.94 |
| Pigment | 0.15 | 0.15 | 0.15 | 0.11 | 0.09 |
| TOTAL | 100.00 | 100.00 | 100.00 | 100.00 | 100.00 |

Example 1

Tensile Testing

A 2 inch by 2 inch portion of the panel assembly (including the honeycomb layers, the adhesive and the mesh) is adhered to steel panels. The steel panels are then affixed to the mechanical test machine which exerts force to pull apart the steel panels. The portion of the panel assembly is then pulled apart at a rate of 0.5 mm per minute. No failure occurs at the honeycomb structure/adhesive interface. Failure occurs only within the honeycomb structure.

Example 2

Shear Testing

A 2 inch by 2 inch portion of the panel assembly (including the honeycomb layers, the adhesive and the mesh) is attached to steel plates. The portion of the panel assembly is placed in a mechanical testing machine and compressed at a rate of 0.5 mm per minute. No failure occurs at the honeycomb structure/adhesive interface. Failure occurs only within the honeycomb structure.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consists of, the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this. Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It will be appreciated that the above is by way of illustration only. Other ingredients may be employed in any of the compositions disclosed herein, as desired, to achieve the desired resulting characteristics. Examples of other ingredients that may be employed include antibiotics, anesthetics, antihistamines, preservatives, surfactants, antioxidants, unconjugated bile acids, mold inhibitors, nucleic acids, pH adjusters, osmolarity adjusters, or any combination thereof.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not It is understood that the above description is intended to be illustrative and not restrictive. Many embodiments as well as many applications besides the examples provided will be apparent to those of skill in the art upon reading the above description.

The explanations and illustrations presented herein are intended to acquaint others skilled in the art with the invention, its principles, and its practical application. Those skilled in the art may adapt and apply the teachings in their numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A method for assembly of a panel structure comprising:
   roll coating an adhesive onto a first edge of a first honeycomb layer, the first honeycomb layer including the first edge and a second edge;
   roll coating the adhesive onto a second edge of a second honeycomb layer, the second honeycomb layer including a first edge and the second edge;
   tacking a mesh onto the first edge of the first honeycomb layer and placing the second honeycomb layer onto the mesh so that the adhesive located upon each of the first and second honeycomb layers cures to create a structural bond between the first and second honeycomb layers and the mesh, thereby forming a honeycomb structure;
   locating a composite skin which includes one or more openings located through the composite skin onto the first edge of the second honeycomb layer;
   locating a backing plate which includes one or more openings therein onto the second edge of the first honeycomb layer; and
   wherein the adhesive includes an epoxy resin and contacts only exposed edges of the first and second honeycomb layers and does not cover any openings of the honeycomb structure.

2. The method of claim 1, wherein the composite skin is adhered to the first edge of the second honeycomb layer.

3. The method of claim 1, wherein the backing plate and adhesive is located onto the second edge of the first honeycomb layer.

4. The method of claim 1, wherein viscosity of the adhesive is less than about 2000 Pa·s at 8 rad/s so that the adhesive effectively adheres to the first edge of the first honeycomb layer and the second edge of the second honeycomb layer during roll coating and does not cover any openings of the honeycomb structure during roll coating.

5. The method of claim 1, wherein viscosity of the adhesive is at least about 800 Pa·s at 8 rad/s so that the adhesive does not drip off from any edge of the honeycomb structure.

6. The method of claim 1, wherein pot life of the adhesive is at least about 45 minutes at a temperature of about 200° F. to 275° F.

7. The method of claim 1, wherein glass transition temperature of the adhesive is greater than about 300° F.

8. The method of claim 1, wherein the mesh includes a stainless steel, aluminum or glass material.

9. The method of claim 1, wherein the mesh includes a temperature resistant polymer material so that the material does not degrade when experiencing temperatures of at least about 300° F.

10. The method of claim 1, wherein the mesh includes polyetheretherketone.

11. The method of claim 1, wherein the mesh includes polyethylene terephthalate.

12. The method of claim 1, wherein the first honeycomb layer, the second honeycomb layer or both include one or more openings and wherein the first honeycomb layer, the second honeycomb layer, or both include a foam material located within the one or more honeycomb openings.

13. The method of claim 1, wherein the mesh has a Rayl value of from at least about 5 rayls to less than about 150 rayls.

14. The method of claim 1, wherein the mesh includes openings having an average diameter of at least about 10 microns and less than about 50 microns.

15. The method of claim 1, wherein the adhesive is sufficiently stable so that post-cure it does not deteriorate at temperatures of greater than 300° F. for at least about 10,000 hours.

16. The method of claim 1, wherein the adhesive in its pre-cured state is at least 10% by weight liquid epoxy.

17. The method of claim 1, wherein exertion of force to pull apart a 2 inch by 2 inch portion of the panel at a rate of 0.5 mm per minute results in no failure at the honeycomb structure/adhesive interface.

18. The method of claim 1, wherein exertion of force to compress a 2 inch by 2 inch portion of the panel at a rate of 0.5 mm per minute results in no failure at the honeycomb structure/adhesive interface.

19. A method for assembly of a panel structure comprising:
   roll coating an adhesive onto a first edge of a first honeycomb layer, the first honeycomb layer including the first edge and a second edge;
   optionally roll coating the adhesive onto a second edge of a second honeycomb layer, the second honeycomb layer including a first edge and the second edge;
   tacking a mesh onto the first edge of the first honeycomb layer and placing the second honeycomb layer onto the mesh so that the adhesive cures to create a structural bond between the first and second honeycomb layers and the mesh, thereby forming a honeycomb structure;
   attaching a composite skin including one or more openings located through the composite skin to at least one honeycomb layer;
   attaching a backing plate which includes one or more openings therein onto the other honeycomb layer; and
   wherein the adhesive includes an epoxy resin and contacts only exposed edges of the honeycomb layers and does not cover any openings of the honeycomb structure.

20. The method of claim 19, wherein the adhesive:
   i) has a glass transition temperature of greater than about 300° F. post-cure;
   ii) has a pot life of at least about 45 minutes at about 275° F. pre-cure; and
   iii) has a viscosity of at least about 700 Pa·s and less than about 2000 P·s at 8 rad/s pre-cure.

* * * * *